March 5, 1935.     F. L. SCOTT     1,993,286
DRILL CUTTER
Filed Dec. 1, 1933
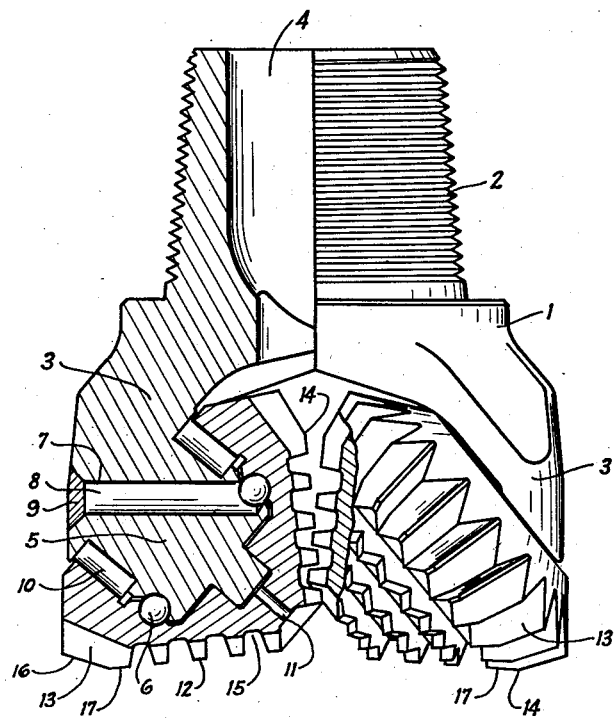
Floyd L. Scott INVENTOR
BY Jesse R. Stone
ATTORNEY Patented Mar. 5, 1935

1,993,286

UNITED STATES PATENT OFFICE 1,993,286

DRILL CUTTER

Floyd L. Scott, Houston, Tex., assignor to Hughes Tool Company, Houston, Tex., a corporation of Texas Application December 1, 1933, Serial No. 700,504

2 Claims. (Cl. 255—71)

My invention relates to cutters for deep well drills, and pertains more particularly to the teeth formed upon cutters of approximately conical shape employed particularly in drilling hard or semi-hard formations.

The well drill upon which the invention is shown is of the conventional type where two or more approximately conical shaped cutters are mounted on a drill head with the teeth on each cutter offset from those on adjacent cutters so that they may roll upon and cut different tracks on bottom. In such cutters it is desirable, for best results, to provide teeth thereon adjacent the wall of the hole which will withstand the heavy cutting which must be accomplished along the outer circumference of the hole where greater surface must be covered. Teeth must be formed adjacent the outer portion, or base, of each of the cutters, and said outer teeth, in such case, are not offset along that zone. The cutters must hence be shaped on two or more intersecting conical surfaces, the outer surface or zone being formed on a cone of longer taper than the inner one. When this is done, however, it has been customary to have the teeth on the outer zone terminate on their inner sides at the point of intersection of the conical surfaces. This causes excessive wear on the ends of the teeth adjacent the intersection and loss of cutting efficiency results from the rapid dulling of the teeth along this angle of intersection between the two conical surfaces, the reason being that the material at the re-entrant angle is harder to remove than it is on a plane surface or on one where the angle projects upwardly.

It is an object of my invention to avoid the rapid wear previously experienced along the line of intersection above referred to by extending the teeth in the outer row from the base toward the apex of each cone a sufficient distance to pass this line, thus leaving no teeth terminating at this line of greater wear.

I desire to form a row of cutting teeth at the base of the cutter which extends a greater distance longitudinally of the cone so as to have the line of intersection of the conical surfaces between the ends of the teeth on said row.

In the drawing herewith is a well drill shown partly in front elevation and partly in central longitudinal section.

The well drill used in illustrating my invention is an ordinary two cone drill with interfitting teeth on the cutters. It is to be understood that the invention is not confined to such a drill but may be employed on three cone drills or on drills where the teeth on the cutters do not necessarily interfit. The head 1 of the bit has an upper threaded shank 2 and two downwardly diverging legs 3. The shank and body have a wide passage 4 for flushing fluid axially thereof.

The legs 3 have downwardly and inwardly inclined shafts 5 upon which the cutter shells 6 are rotatable. The cutters are locked rotatably upon said shafts by a row of balls 6 fitting partly in the shaft and partly in the cutter wall. Said balls are introduced into position through an opening 7 diagonally of the shaft. Said opening is filled with a plug 8 held in position by a bond of welding material 9. There is also an outboard roller bearing assembly 10 at the base of the cutter. The cutter is spaced slightly from the shaft and an opening 11 is formed in the cutter shell to allow for circulation of flushing fluid.

The cutters are formed with cutting teeth 12 thereon cut in circumferential rows about the cutter, said rows being spaced apart, and offset relative to the rows on the adjacent cutter, so that they may roll upon different zones on the well bottom.

Adjacent the base of each cutter is a row of teeth 13 which is materially longer than the other teeth. They may also be cut slightly deeper in the cutter shell for the reason that a greater thickness of shell is obtained at the base. This outer row of teeth is opposed to a similar row on the adjacent cutter and hence the cone must be beveled off to space the outer teeth from the adjacent cutter and prevent their engagement with adjoining cutters and locking them against rotation on their shafts. I form and mount the cutters to obtain an upwardly diverging interfit with the adjacent cones, the row of teeth 13 on each cutter being spaced materially from the corresponding row on the other cutter.

The cutter is formed with two conical tapered surfaces, the one at the base extending up to the angle 14 on each cutter; the other taper extending from the angle 14 to the apex. The forward tapered area or zone 15 is toothed to cut the inner surface of the hole, while the outer zone represented by the outer portion of the row of teeth at 16 cuts the larger outer area of the well bottom.

It will be seen that the outer zone in the hole is cut by both cutters and so is that portion of the well bottom lying within area covered by the portion of the teeth lying inside the re-entrant angle 14 and indicated at 17.

In the cutting of the formation at the well bottom, the teeth on the cutters contact with the rock with a chisel action, the teeth being forced into the material and the material at the point where the tooth enters will be extruded upwardly and laterally. At the wall of the hole the extruded material cannot be moved into the wall but must be forced upwardly and inwardly only. Much hard wear comes upon the outer ends of the teeth. Such wear is also great at the point where the edge of the teeth at the angle of intersection 14 engages bottom. If the tooth ends at this angle as is now commonly the case, the end of the tooth at this line will wear blunt quickly as the extruded material will tend to be forced upwardly at the end of the tooth at that point. By extending the cutting edge inwardly beyond the angle 14, this wear is materially avoided. The teeth at 17 on one cutter are slightly longer than on the other cutter and hence the ends of the teeth do not track on the bottom of the hole and the ends do not wear so rapidly. Where the wear would tend to be greatest, that is, along the angle 14, the tooth is formed with material support on both sides of that line so that wear will not interfere with the continued operation of the tool and I am assured that there will be no uncut ridge left upon the well bottom to hold up the progress of the drill.

This manner of cutting the teeth leads to more uniform and continued cutting of the drill. I am enabled to cut longer before the drill need be withdrawn. The particular advantage lies in its rapid cutting and greater life before the teeth are worn out. The teeth at the angle where cutting is most difficult are supported by material on both sides of the angle, and the teeth on both the cutters roll upon this zone.

What I claim as new is:

1. A well drill including a head, downwardly converging cutter shafts on said head, tapered cutters on said shafts, the peripheral cutting surface of each cutter being formed on two intersecting conical surfaces having different tapers, teeth on said surfaces, the crests of the outer row of teeth adjacent the base of each cutter lying on both conical surfaces, the outer row of teeth on one cutter extending further on to the zone of the apex than those on the other cutter, the remaining rows of teeth being offset relative to the rows of teeth on the adjacent cutters.

2. A well drill including a head, downwardly converging cutter shafts on said head, tapered cutters on said shafts, the peripheral cutting surface of each cutter being formed on two intersecting conical surfaces having different tapers, teeth on said surfaces, the outer row of teeth adjacent the base of each cutter being extended longitudinally of the cutter past the line of intersection of said conical surfaces, the row of teeth at the base of one cutter being extended farther toward the apex than those on the other cutter, and a plurality of circumferential rows of teeth on the inner tapered surface between said outer row and the apex of the cutter said cutters being mounted so that the distance between said last named teeth on adjacent cutters increases upwardly toward their bases.

FLOYD L. SCOTT.